United States Patent
Chaudhary et al.

(10) Patent No.: US 12,437,120 B2
(45) Date of Patent: Oct. 7, 2025

(54) ENABLING SECURE DEBUG LOGGING

(71) Applicant: Dell Products L.P., Round Rock, TX (US)

(72) Inventors: Vikas Jagannath Chaudhary, Pune (IN); Abhidnya Sushant Joshi, Pune (IN)

(73) Assignee: Dell Products L.P., Round Rock, TX (US)

( * ) Notice: Subject to any disclaimer, the term of this patent is extended or adjusted under 35 U.S.C. 154(b) by 280 days.

(21) Appl. No.: 17/578,832

(22) Filed: Jan. 19, 2022

(65) Prior Publication Data

US 2023/0229816 A1    Jul. 20, 2023

(51) Int. Cl.
  *G06F 21/78*  (2013.01)
  *G06F 11/362*  (2025.01)
  *G06F 21/60*  (2013.01)

(52) U.S. Cl.
  CPC .......... *G06F 21/78* (2013.01); *G06F 21/602* (2013.01); *G06F 11/362* (2013.01)

(58) Field of Classification Search
  None
  See application file for complete search history.

(56) References Cited

U.S. PATENT DOCUMENTS

| | | | |
|---|---|---|---|
| 10,936,191 B1 * | 3/2021 | Lakshminarayanan | G06F 3/067 |
| 2014/0075242 A1 * | 3/2014 | Dolinina | G06F 11/3672 714/E11.178 |
| 2014/0189775 A1 * | 7/2014 | Burch | G06F 21/606 726/1 |
| 2020/0201652 A1 * | 6/2020 | Alexander | G06F 9/3836 |
| 2020/0344112 A1 * | 10/2020 | Reeve | H04L 63/029 |
| 2021/0342463 A1 * | 11/2021 | Tsirkin | H04L 63/123 |
| 2022/0368528 A1 * | 11/2022 | Vennapusa | H04L 9/3073 |

\* cited by examiner

*Primary Examiner* — Jason D Recek
*Assistant Examiner* — Emad Siddiqi
(74) *Attorney, Agent, or Firm* — Staniford Tomita LLP

(57) ABSTRACT

A software product that requires debugging receives a security token in response to a request to enable debug logging. The security token is validated. Upon a successful validation of the security token, debug logging is enabled and debug logs are encrypted while being dumped. A duration for which debug logging has been enabled is tracked. When the duration reaches a cutoff duration, the debug logging is disabled.

19 Claims, 6 Drawing Sheets

ENABLING SECURE DEBUG LOGGING

TECHNICAL FIELD

The present invention relates generally to information processing systems, and more particularly to debugging software products.

BACKGROUND

Debugging refers to identifying and fixing problems that can arise in software products. Such problems are referred to as "bugs." Many software vendors engage in rigorous testing of their software products before release. Nonetheless, it is virtually impossible to guarantee a defect-free product. Modern day software products are composed of many components and services which interact and depend on each other. These interactions and dependencies coupled with time pressures to release new products can make identifying and fixing problems during development very difficult.

To facilitate debugging, software products can be designed to record messages or events when processing requests and transactions. There can be different levels of granularity at which events are logged. Messages may be printed out to a file that may be referred to as a debug or log file. Depending on the type of software product, the messages may detail certain database operations, system processes, errors, and so forth. The information in a debug or log file can provide important clues to an engineer as to why a software product such as an application program or other software component is not behaving as intended.

Maintaining a debug log, however, has many drawbacks. For example, compute resources are required to process and print debug messages. Over time, the size of the debug log can grow very large. Continuous logging at a debug level can degrade system performance. There can also be security concerns. For example, security-related problems can be particularly challenging to debug. It is helpful to include with the debug messages the values for the parameters that are being evaluated. However, printing sensitive information such as passwords, encryption keys, and the like poses a security risk. Current approaches to logging do not adequately address these and other concerns.

There is a need for improved systems and techniques for debug logging.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
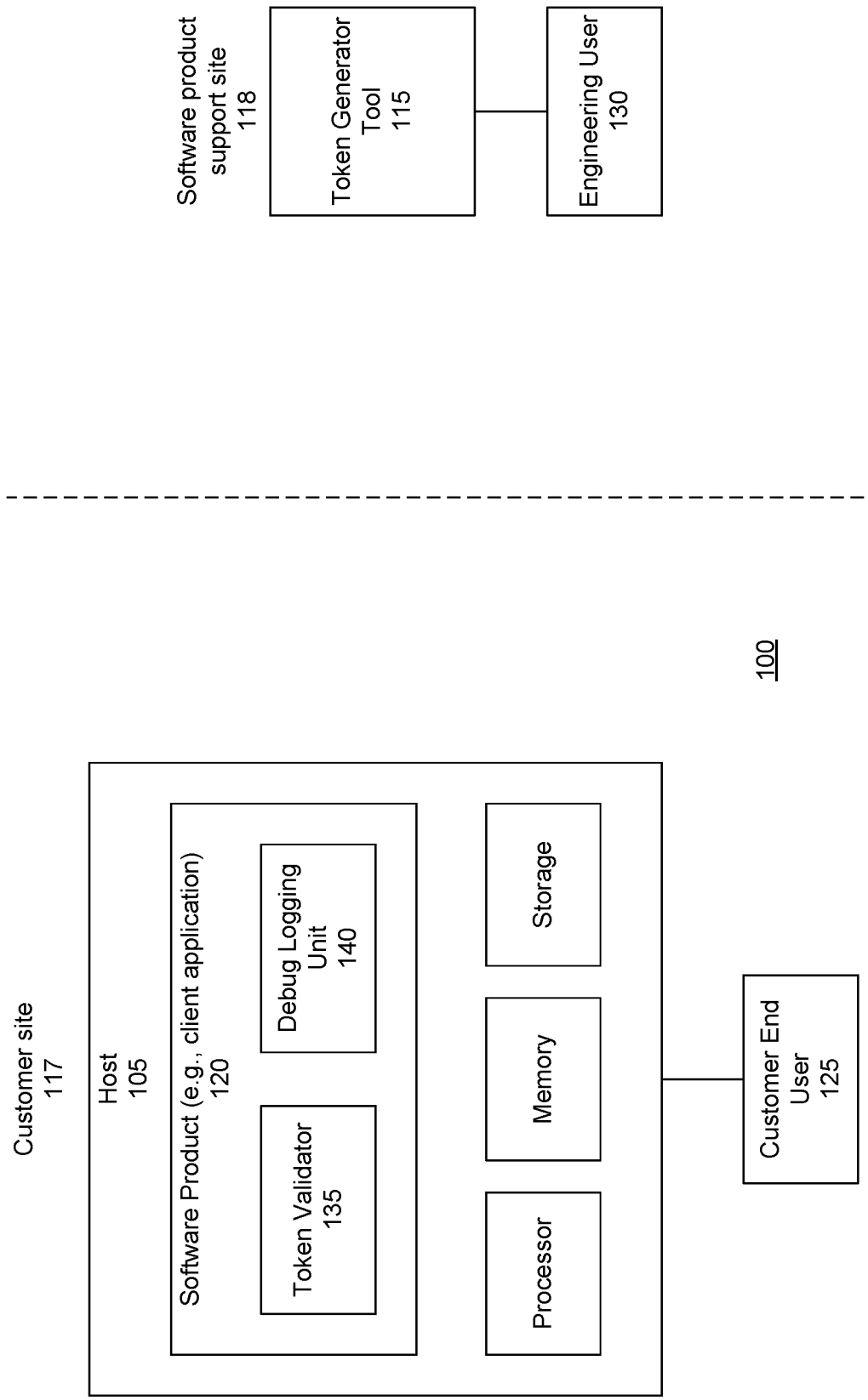
FIG. 1 shows a block diagram of an information processing system for enabling controlled and secure debug logging of a software product, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

Disclosed herein are methods and systems for a secure and controlled log enablement for critical debug messages. FIG. 1 shows a block diagram of an information processing system 100 within which such methods and systems for enabling and controlling debug logging of a software product, such as an application, may be implemented. In the example shown in FIG. 1, there is a host 105 and token generator tool 115. The host resides at a customer site 117 and the token generator tool resides at a product support site 118.

The host may be a general purpose computing device with hardware and software. The host may include, for example, a processor, memory, and storage connected by a bus architecture or other interconnection scheme. Some examples of computing devices include servers, desktop computers, laptops, tablets, smartphones, mobile communication devices, wearable devices, Web-enabled devices, Internet of Things (IoT) devices and appliances, and the like.

The host includes a software product 120 installed on the host. The software product can include any type of computer-executable code installed and executed on a computing system. Examples of software products include client application programs, libraries, operating systems, enterprise applications (e.g., enterprise backup or data protection applications), productivity programs (e.g., word processing programs, spreadsheet programs), database applications, distributed applications, and so forth. The software product may be used by a customer end user 125.

The product support site provides a point of contact that the customer user can contact to help resolve any problems that the customer may encounter with the software product. For example, if the software product is not operating as expected, the customer end user may call, email, or text message a customer support person at the product support site. The product support site may, for example, be a vendor or developer of the software product. At the product support site, there is an engineering user 130 at the token generator tool. The token generator tool is a program installed on authorized computers at the product support site.

In an embodiment, the software product installed at the host is set, by default, to not log debug messages. That is, debug logging is disabled. When there is a need or request to activate or enable debug logging to help resolve an issue with the software product, the engineering user uses the token generator tool to generate a security token. The security token is provided to the software product. The software product includes a token validator 135 and a debug logging unit 140.

The token validator is responsible for validating the security token. Upon a successful validation of the security token, the debug logging unit of the software product is enabled. Once enabled, the debug logging unit prints or records debug-level messages in an encrypted format to a debug log file. The debug log file may be stored locally at the host. The debug messages may include, for example, sensitive information such as passwords, encryption keys, extended messages having more detail than what would otherwise be recorded for non-debug level logging, core dumps, or combinations of these. A core dump, also referred to as a memory dump, includes the recorded state of the working memory of a computer program at a specific time. Information in a core dump may include the processor registers, which may include the program counter and stack pointer, memory management information, and other processor and operating system flags and information. The software product can log events at different levels of detail, granularity, or verbosity. In an embodiment, logging at the debug level is reserved for the debug logging unit.

The debug logging unit tracks a duration of time for which debug logging has been enabled. Once a predetermined cutoff duration of time has been reached, the debug logging unit automatically disables debug logging. The encrypted file containing the debug messages may then be provided to the engineer or other authorized user. For example, the encrypted debug file may be transmitted via email by the customer end user to the engineer. The engineer, upon receipt of the encrypted debug file, is able to decrypt the debug file. Once decrypted, the engineer can then review and analyze the logged events, parameters, values, and other information in order to identify and address the issues that the customer end user is having with the software product.

Security is a key concern of any software product or application. Applications/products offer security at various levels such as certificate-based authentication, authentication using password hashes, encryption at rest, on write data encryption, and so forth. Applications, for example, also often use encryption-decryption to securely store critical information in memory which is reused. While security is desirable, with security, complexity becomes part of an application or software product. It is especially difficult to debug security related problems. It is generally undesirable to print or log critical/sensitive information such as passwords, password hashes, encryption keys and other secret information in the debug logs for security reasons. This adds constraints and difficulties when an engineer or developer attempts to debug authentication-related and similar issues as there may not be sufficient debug information in the debug logs.

In an embodiment, systems and techniques provide a secure and controlled way to enable additional critical/sensitive debug messages using tokens provided by a vendor or developer of the software product. This token is valid only for a limited time and is unique for each system for a given time. Once log messages are enabled, they are disabled automatically within a predefined time. Further, log messages are written in the logs file in an encrypted format so that no one else can read it other than the authorized person. This helps to debug security related problems in a secure and controlled way resulting in speedy root cause analysis (RCA) of an issue.

Applications and products provide a lot of security at various levels. There are many challenges in debugging security-related issues. Ironically, at times, customers are asked about their passwords, hashes, keys, etc. to debug the problems. While this information is necessary from an engineering perspective to correctly root cause the issues, this information often gets passed on from customers to support personnel and then to engineers. Customers, understandably, can feel very uncomfortable sharing this information. Sometimes customers will use temporary accounts, temporary passwords, and the like so that they can provide this information for debugging purposes and have less concern about its security. But this is not always possible and depends upon the type of the problem encountered. Sometimes, debugging requires this sensitive information to be printed in logs. In some cases, this information is not logged even at verbose log levels. Thus, engineers end up giving the customer certain application binaries/packages which can temporarily print this information in logs. All of these ways are very cumbersome and inconvenient to engineers as well as customers, expose risks to security, and result in delaying root cause analysis of the problems and issues.

The system shown in FIG. 1 provides a secure and controlled way of logging sensitive/critical information in an encrypted format which can help engineers and customers achieve faster root cause analysis. Benefits of the system include: 1) A secure way of enabling logs that allows only authorized persons to perform this action; 2) Logging can be enabled anytime and there is no need to rebuild the application; 3) Logging is turned on only for a specific time which restricts the availability of this feature only for the specific time window; 4) Logs are dumped in encrypted form which makes those logs secure; and 5) The technique provides a secure and extended way of logging which can be applied on top of any logging mechanism.

Figure 2:
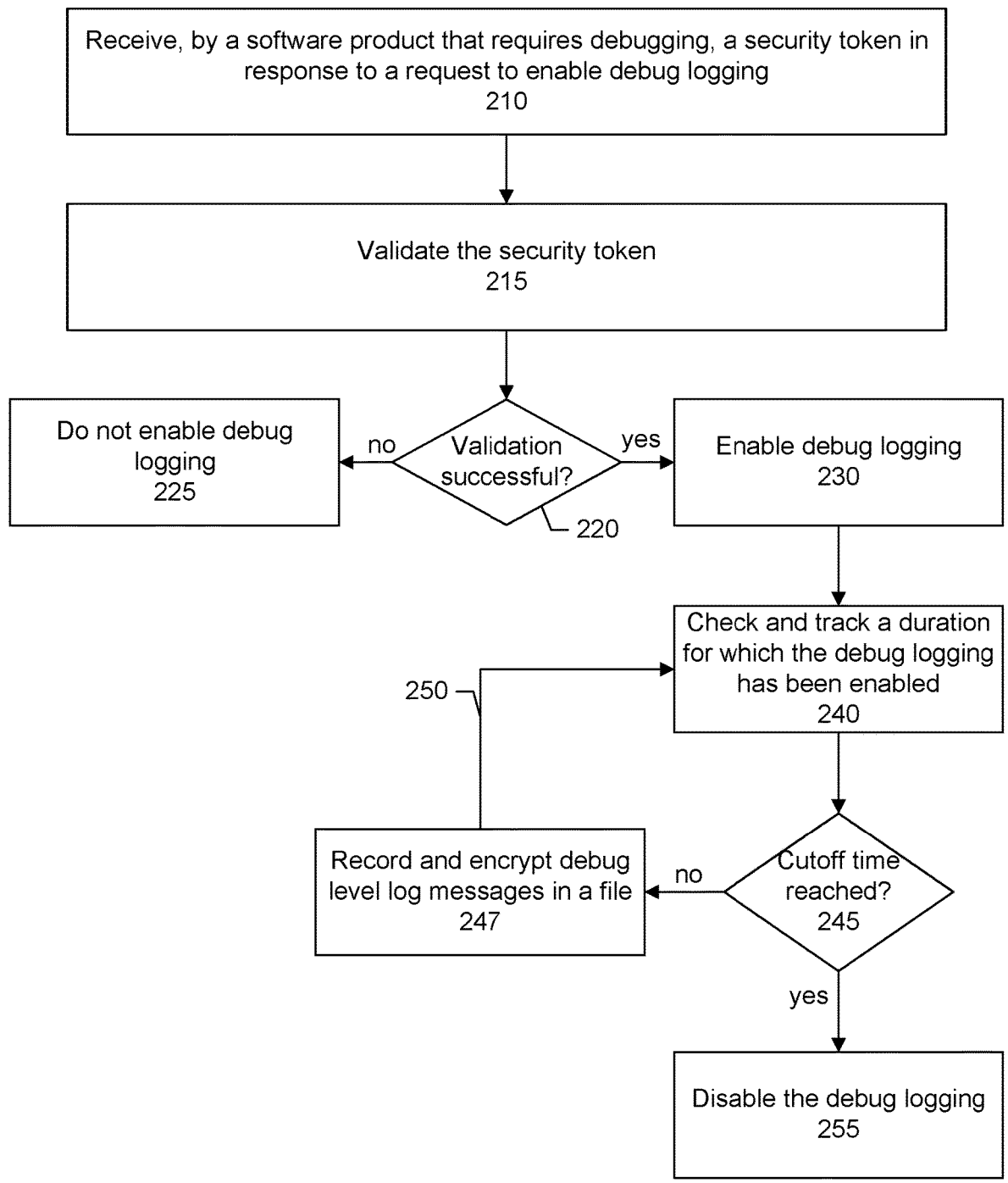
FIG. 2 shows an overall flow for enabling and controlling debug logging in a secure manner, according to one or more embodiments.

FIG. 2 shows a flow for securing and controlling the logging of debug messages for a software product. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 210, a software product that requires debugging receives a security token. The security token may be provided in response to a request to enable debug logging. For example, a customer end user of the software product may report a problem related to an authentication sequence of the software product. Authentication is an important part in any communication. In order to efficiently address problems with authentication, it can be helpful for an engineer to review not only the parameters involved in the authentication sequence, but the values as well. For example, it may be that authentication hashes are being incorrectly generated, an incorrect cipher is being used, and the like.

In an embodiment, input parameters to generate the token include values specific to the particular software product. In an embodiment, the parameters include a version number of the software product and hostname of a host on which the software product is running. The input may further include a current local time of the host. This information allows for generating a security token that is specific to the particular software product including the particular host on which the particular software product has been installed. That is, use of the token is restricted to the particular host on which the particular software product has been installed. For example, the token will not be able to be used to enable debug logging for the same version of the software product that happens to be installed on a different host. The time information further allows for controlling the amount of time for which the security token remains valid and the duration for which debug logging is to be enabled.

In an embodiment, the security token is generated using an Advanced Encryption Standard (AES) encryption engine. AES is a symmetric encryption algorithm as it uses a single key to encrypt and decrypt information. AES provides a cipher for encrypting (and decrypting) data. In this embodiment, the software product version number is passed as a key to the AES cipher. The AES cipher uses the key (e.g., software product version number) along with an initialization vector (IV) to generate the security token by encrypting the hostname, software product version number, and current local time of the host hosting the software product. In an embodiment, the IV is a hard-coded value that is known to the software product (and token generator tool) and is the same across the software product and token generator tool. This allows the software product to decode the token generated by the token generator tool. It should be appreciated that AES is merely an example and in other embodiments different or other token generation and validation techniques may instead or additionally be used. One of ordinary skill in the art will readily recognize that there can be other values, properties, or attributes or combinations of values, properties, or attributes that may instead or additionally be used as a key to provide the same functionality of securely enabling and controlling debug level logging.

In a step 215, the software product upon receipt of the security token validates the security token. In an embodiment, the security token is included in a configuration file that is provided (e.g., sent or emailed) to the customer end user. The customer end user can move the configuration file into a designated folder associated with the software product or otherwise use the software product to browse, locate, and load the configuration file. The software product reads the configuration file to retrieve the security token along with other configuration settings.

In a step 220, the token validator unit of the software product makes a determination as to whether the validation was successful. If the validation was unsuccessful, debug logging is not enabled (step 225). The software product may continue to operate without debug logging. That is, even if the validation is not successful, the software product is allowed to continue running, but without the debug logging having been enabled.

More particularly, in an embodiment, the token validator unit of the software product uses the software product version number as a key to decrypt or decode the security token and obtain a plain text form of the hostname, version number, and time. The token validator unit checks that the decoded version number matches the version number of the software product, checks that the decoded hostname matches the hostname of the host hosting the software product, and checks that the decoded time for the token has not yet expired. It should be appreciated that using the software product version number as a key is merely an example of one particular implementation of the system. In other embodiments, other values, properties, or attributes may instead or additionally be used as a key for generating a security token. One of ordinary skill in the art will readily recognize that there can be other values, properties, or attributes or combinations of values, properties, or attributes that may instead or additionally be used as a key to provide the same functionality of securely enabling and controlling debug level logging.

The security token has a shelf life and is thus designed to be valid for a limited or finite period of time after generation. For example, the security token may be valid for 5, 10, 15 minutes, or for any length of time as desired. The expiration time may be configured to be less than 5 minutes or greater than 15 minutes. If a check of the current time indicates the security token has expired, the validation is failed. This helps to prevent old security tokens from being reused to enable debug logging and steal sensitive information. Likewise, if any of the software product version number or hostname of the host on which the software product is installed does not match the version number and hostname for which the security token was generated, the validation will also fail.

If, however, the validation was successful, debug logging is enabled (step 230). As discussed, in an embodiment, logging at a debug level is designed to be enabled for a limited or certain duration of time (e.g., 5, 10, or 15 minutes). Once a predetermined cutoff time has been reached, debug logging is automatically disabled. In particular, in a step 240, a duration for which debug logging has been enabled is checked and tracked. In a step 245, a determination is made as to whether a predetermined cutoff time has been reached. If the cutoff time has not been reached, the dumping or logging of messages proceeds.

In particular, as shown in a step 247, debug logging includes recording and encrypting debug messages in a file. Debug messages may be printed to a log file that is separate from a log file containing non-debug level messages. For example, there can be two separate log files. The software product may maintain a first log file in which events are recorded at a first level of detail. When debug logging is enabled, the software product may generate a second log file, different from the first log file, in which events are recorded at a second level of detail, greater than the first level of detail. For example, the second log file may include sensitive information such as usernames, passwords, keys, extended information, core dumps, and the like. Such information is not included in the first log file. The second log file may be maintained in an encrypted format whereas the first log file may be maintained in an unencrypted format.

Enabling debug logging may include, for example, increasing a level of detail of messages recorded in a log file as compared to logging at a non-debug level. For example, the software product may provide for two or more levels of detail at which messages may be recorded. A first level may be referred to as a non-debug level. A second level may be referred to as a debug-level. The second level may have more detailed messages as compared to the first level. In an embodiment, the software product may have a default set to record at the first level. Activating or enabling the second level of recording (e.g., debug level), however, is restricted and requires validation of a security token. A size of a debug log file may be greater than a size of a non-debug log file.

The process loops back 250 to continue checking and monitoring the duration for which debug logging is to be enabled. Once, the cutoff time has been reached, in a step 255, debug logging is disabled. That is, in an embodiment, debug logging is enabled for a limited or finite period of time. For example, debug logging may be enabled for 5, 10, 15 minutes, or for any length of time as desired. Debug logging may be configured to be less than 5 minutes or greater than 15 minutes.

The technique shown in FIG. 2 allows for an engineer or developer of the software product to retain control over the debug logging mechanism of the software product. Logging, especially debug logging or logging at low levels of granularity, consumes compute resources. Log files can consume large amounts of disk space. The performance of the software product or application may suffer if the log files grow too large or debug-level logging continues for an extended period of time. Further, as discussed, there are security risks when logging sensitive information (e.g., passwords, secure keys, certificates, and the like). A user attempting to review a log file in which debug logging was enabled for an extended period of time may be overloaded with information. Thus, it is generally not desirable to be continuously logging at a debug-level. A customer end user may not be fully aware of the impact that logging at the debug level may have. The technique shown in FIG. 2, including the use of the token, helps to guarantee no accidental enablement of debug logging. In an embodiment, there can be other log levels that are configurable by the customer end user. In this embodiment, however, configuring debug level logging is reserved for the engineering or developer user and not exposed to the customer end user.

Figure 3:
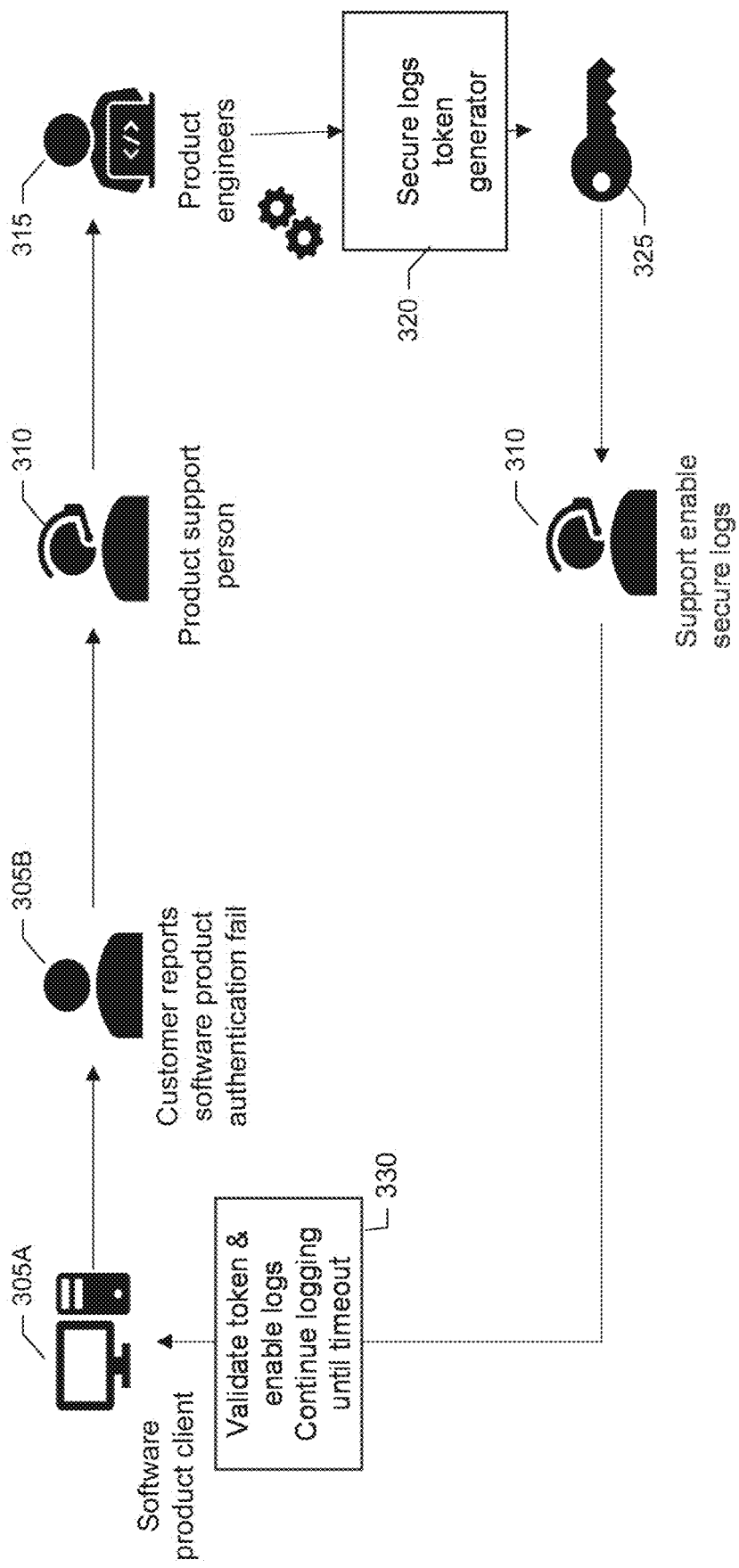
FIG. 3 shows a block diagram of entities that may be involved with debug logging, according to one or more embodiments.

FIG. 3 shows a block diagram of entities that may be involved in a system for securing and controlling the logging of debug messages for a software product, according to one or more embodiments. The example shown in FIG. 3 includes four entities including a customer and their software product or client application 305A,B, support person 310, engineer 315, and "secure token generator" application 320. The secure token generator is a program that runs on an authorized host. In an embodiment, once the need to debug a security or other related issue is identified, the support person will raise an official support request (SR).

The support request includes information such as a customer-specific application version, and host on which the problem with the application is seen. This information is used by the engineers to feed into the "secure token generator" application. This application creates a token 325 that has a shelf life. In an embodiment, the shelf life is about 10 minutes.

This token is passed by the support engineer to the customer's client application. The customer's client application, upon reload, evaluates (330) the validity of this token. In an embodiment, the token is specifically created for a particular application, version, host, and for a specific time window and enables a special logging level, e.g., debug logging level.

In an embodiment, it is assumed that the software product (e.g., applications) will already have certain log messages at this critical level which will be turned on as part of this process. Messages will be logged in an encrypted way. Once the logging is enabled, it will be turned on only for a certain time window, e.g., 10 minutes. To have logging continue beyond 10 minutes, a longer time window can be configured or the token may be regenerated.

Figure 4:
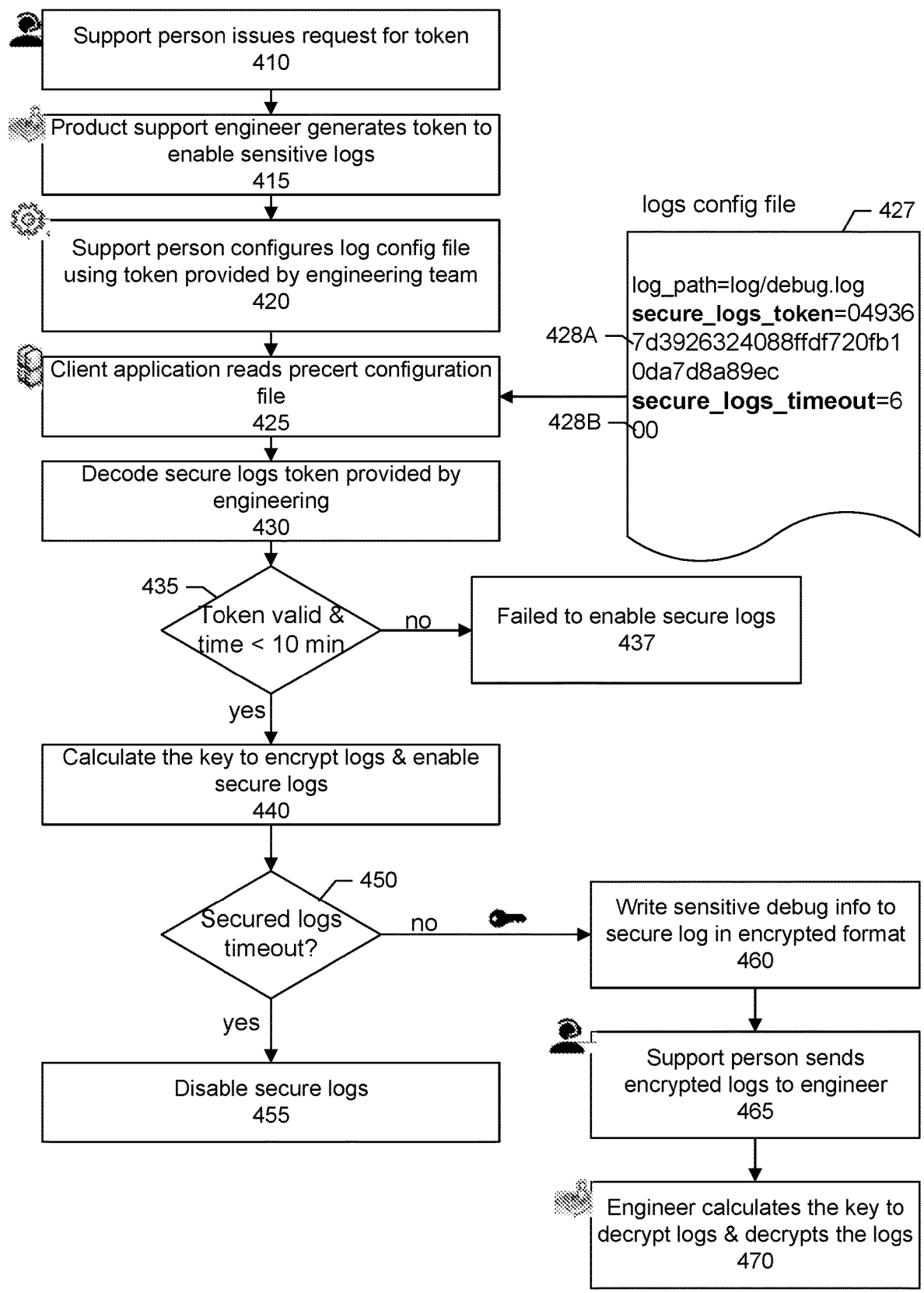
FIG. 4 shows another flow for enabling and controlling debug logging in a secure manner, according to one or more embodiments.

FIG. 4 shows further detail of a flow for the entities shown in FIG. 3. In a step 410, a support person has requested a security token. The support person issues the request to the software engineer in response to a problem that a customer of the software product may be having. The request, including a version number of the software product and hostname of a host at which the software product is installed, is passed to the software engineer who uses a token generator tool to generate a security token (step 415). As discussed, in an embodiment, the version number of the software product is used as the key to encode details associated with the software product including the version number of the software product and hostname of the host at which the software product is installed. Again, it should be appreciated that these particular parameters are merely examples of one particular implementation of the system. A person of ordinary skill in the art will readily recognize that other parameters or combination of parameters may instead or additionally be used to generate a security token and provide the equivalent functionality of securely controlling activation of debug logging.

In a step 420, the support person generates a configuration file for the software product using the token received from the software engineer. For example, the support person may copy the token and a timeout value into a new configuration file. The configuration file may be referred to as a logs config file. The support person then provides the new configuration file to the customer. For example, the support person may email the configuration file to the customer or provide the customer with a link that the customer can access to download the configuration file.

In a step 425, the software product (e.g., client application that requires debugging) reads the new log configuration file. As shown in the example of FIG. 4, a configuration file 427 may include, among other parameters and values, a token 428A and timeout 428B. The token may be referred to as a secure logs token. The timeout may be referred to as a secure logs timeout. As discussed, in an embodiment, the token is generated based on a particular version of the software product and a particular host on which the product has been installed. In an embodiment, timeout 428B specifies a duration for which debug logging should be enabled. In the example shown in FIG. 4, the timeout has a value of 600 seconds. Thus, upon successful validation of the token, debug logging will be enabled for 600 seconds (or 10 minutes).

In a step 430, the software product at the client host decodes the token. As discussed, in an embodiment, the software product version number is used as the key to encode (and decode) the token. Again, as discussed, using the software product version number as the key is merely an example. In other embodiments, other values, attributes, or properties may instead of the software product version number or in addition to the software product version number may be used as a key for encoding/decoding a security token.

It should be appreciated that any competent key encryption algorithm may be used to generate, encode, and decode a security token including, for example, any type of symmetric algorithm, any type of asymmetric algorithm, or combinations of these. Asymmetric encryption, also referred to as public/private encryption, uses a pair of keys. Data encrypted with one key are decrypted only with the other key in the public/private key pair. Typically, when an asymmetric key pair is generated, the public key is used to encrypt, and the private key is used to decrypt. Symmetric, or secret key encryption, uses a single key for both encryption and decryption. As discussed, the use of symmetric encryption and in particular AES and the software product version number as an AES key is merely an example of one particular implementation of the system. One of ordinary skill in the art will readily recognize that there can be other values or attributes that may instead or additionally be used as a key to provide the same functionality. That is, other embodiments do not use the software product version number as a key for generating a security token to enable debug logging. A token is generated based on one or more of any unique parameters which help identify that particular host and application or software product for which debug logging is desired.

In a step 435, the software product, upon decoding the security token via the software product version number, makes a determination as to whether the token is valid. In an embodiment, validation checks include checking for a match of the software product version number, a match of the hostname, and a check of the current time to ensure that the token has not yet expired based on the time it was generated. If any of the checks fail, secure logs is not enabled (step 437).

Alternatively, if all the validation checks pass, secure logs is enabled. In particular, in a step 440, a key is generated to encrypt the debug messages generated by the software product. Any competent key generation algorithm may be used for key generation, e.g., AES, public/private key encryption, or other. In a step 450, a determination is made as to whether a timeout has been reached. If the timeout has been reached, in a step 455, secure logs is automatically disabled. Alternatively, if the timeout has not been reached, in a step 460, sensitive debug information is written to a secure log in an encrypted format.

Once debug logging has ended, the customer may send, e.g., email, the encrypted secure log to the support person. In a step 465, the support person sends or forwards (e.g., emails) the encrypted logs to the software engineer. In a step 470, the software engineer calculates the key to decrypt the logs and uses the key to decrypt the logs. Once the logs have been decrypted into plain text, the software engineer can review the details, including sensitive information, that has been recorded in the log in order to troubleshoot the problem that the customer is having with the product.

It should be appreciated that including the security token in a configuration file of the software product is merely an example of one particular implementation of the system. For example, in other embodiments, the token may be provided to the customer user in a phone call or included in an email or text message that is sent to the customer user. The customer user, upon receipt of the token, may then manually enter the token into an input box displayed on a user interface of the software product for validation.

In an embodiment, there is a method comprising: receiving, at a software product that requires debugging, a security token in response to a request to enable debug logging; validating the security token; upon a successful validation of the security token, enabling the debug logging; tracking a duration for which the debug logging has been enabled; and upon the duration reaching a cutoff duration, disabling the debug logging. In an embodiment, enabling the debug logging includes encrypting a file storing debug messages.

In an embodiment, the request to enable debug logging comprises a version number of the software product and a hostname of a host at which the software product has been installed. In an embodiment, the method includes upon a not successful validation of the security token, not enabling the debug logging; and after the not successful validation, allowing the software product to continue running without the debug logging having been enabled. In an embodiment, the request to enable debug logging comprises identifying information associated with the software product and the security token is generated using the identifying information.

In an embodiment, validating the security token comprises: checking an expiration time of the security token against a current time; and if the current time indicates that the expiration time of the security token has been reached, not enabling the debug logging.

In an embodiment, enabling the debug logging comprises one or more of logging sensitive information, performing a core dump, or increasing a level of detail for events recorded by the client application.

In another embodiment, there is a system comprising: a processor; and memory configured to store one or more sequences of instructions which, when executed by the processor, cause the processor to carry out the steps of: receiving, at a software product that requires debugging, a security token in response to a request to enable debug logging; validating the security token; upon a successful validation of the security token, enabling the debug logging; tracking a duration for which the debug logging has been enabled; and upon the duration reaching a cutoff duration, disabling the debug logging.

In another embodiment, there is a computer program product, comprising a non-transitory computer-readable medium having a computer-readable program code embodied therein, the computer-readable program code adapted to be executed by one or more processors to implement a method comprising: receiving, at a software product that requires debugging, a security token in response to a request to enable debug logging; validating the security token; upon a successful validation of the security token, enabling the debug logging; tracking a duration for which the debug logging has been enabled; and upon the duration reaching a cutoff duration, disabling the debug logging.

Figure 5:
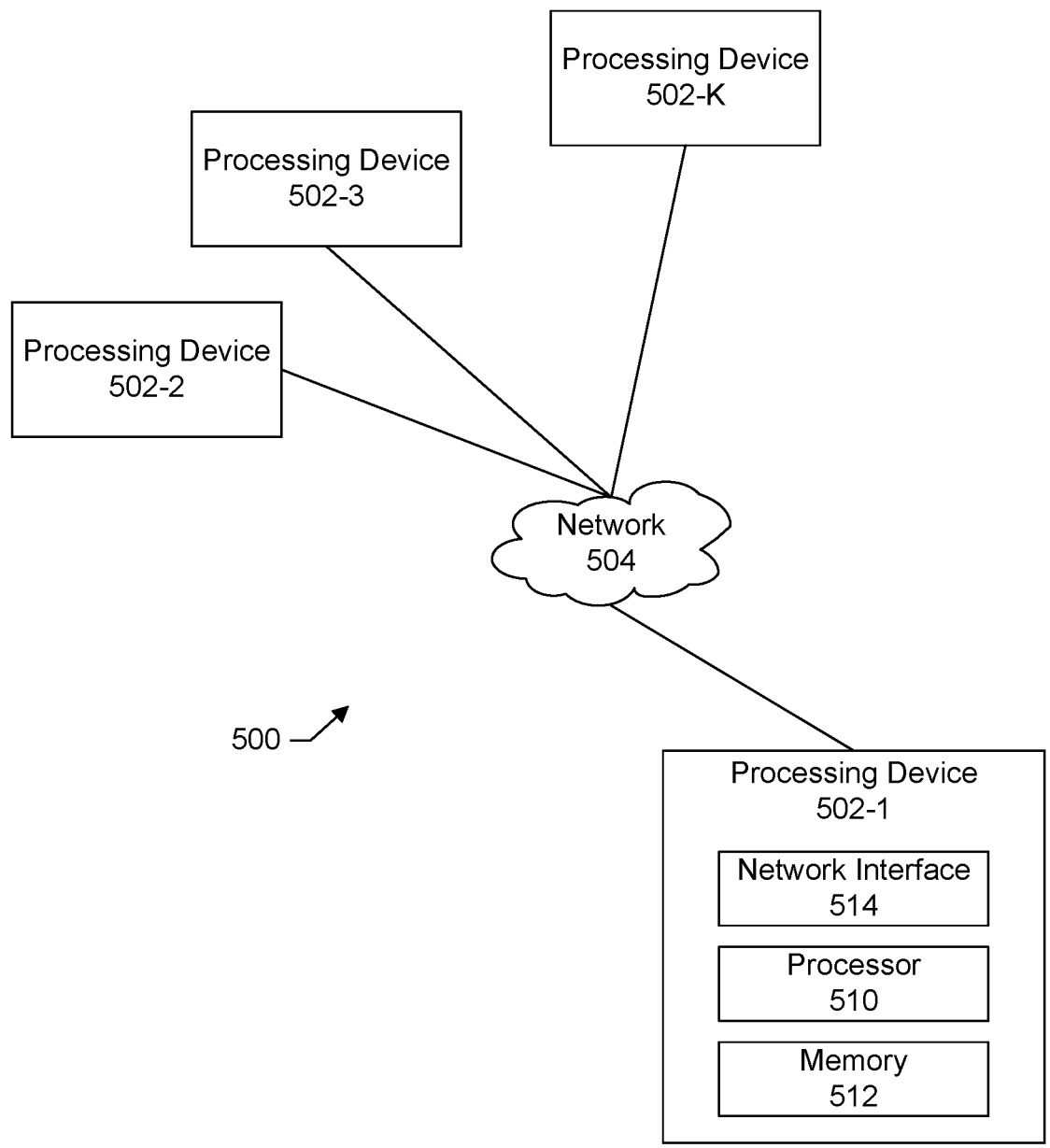
FIG. 5 shows a block diagram of a processing platform that may be utilized to implement at least a portion of an information processing system, according to one or more embodiments.

FIG. 5 shows an example of a processing platform 500. The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 500 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 6:
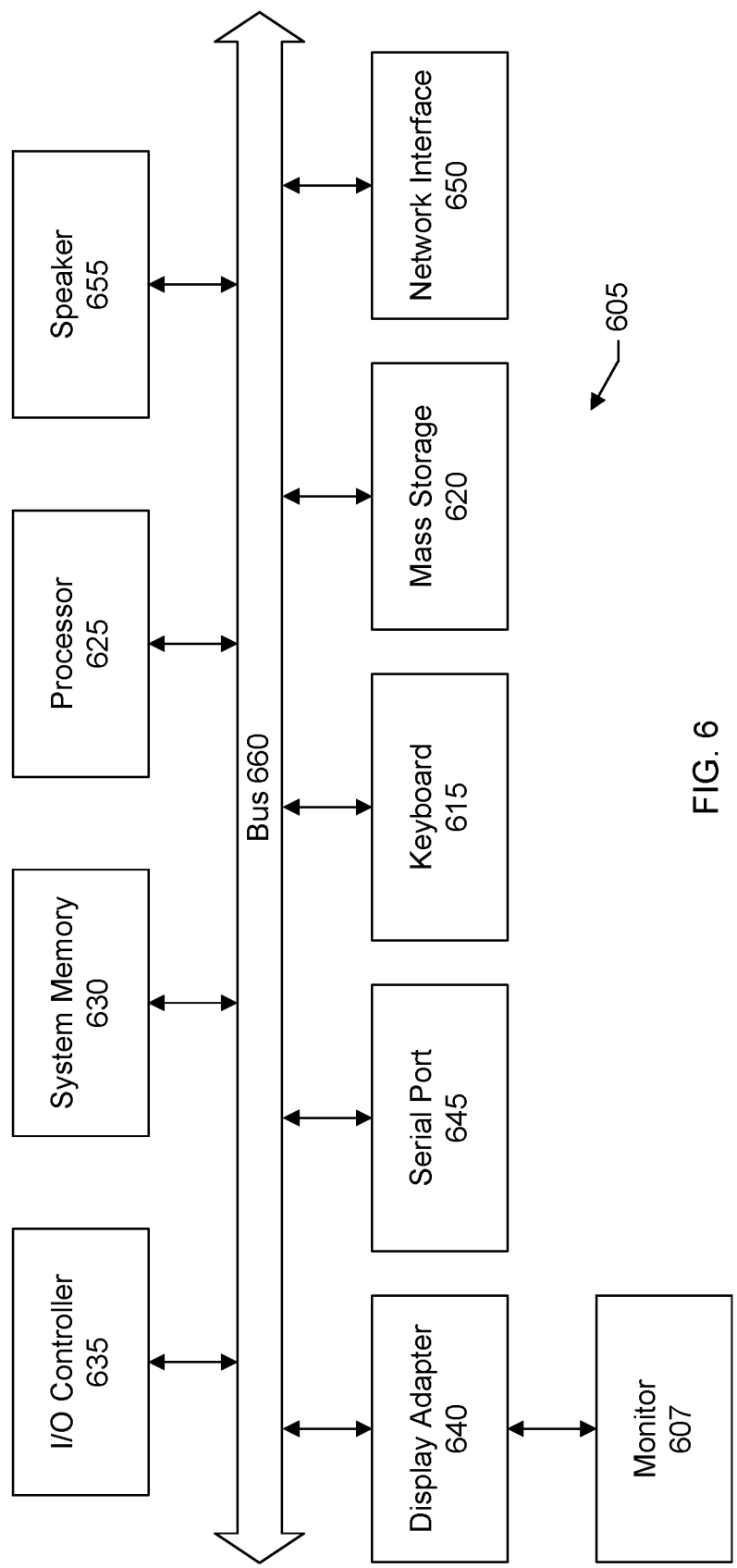
FIG. 6 shows a block diagram of a computer system suitable for use with the information processing system, according to one or more embodiments.

FIG. 6 shows a system block diagram of a computer system 605 used to execute the software of the present system described herein. The computer system includes a monitor 607, keyboard 615, and mass storage devices 620. Computer system 605 further includes subsystems such as central processor 625, system memory 630, input/output (I/O) controller 635, display adapter 640, serial or universal serial bus (USB) port 645, network interface 650, and speaker 655. The system may also be used with computer systems with additional or fewer subsystems. For example, a computer system could include more than one processor 625 (i.e., a multiprocessor system) or a system may include a cache memory.

Arrows such as 660 represent the system bus architecture of computer system 605. However, these arrows are illustrative of any interconnection scheme serving to link the subsystems. For example, speaker 655 could be connected to the other subsystems through a port or have an internal direct connection to central processor 625. The processor may include multiple processors or a multicore processor, which may permit parallel processing of information. Computer system 605 shown in FIG. 6 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
issuing, from an end user at a client, a request for a security token to enable debug logging of a software product that requires debugging, the software product being installed at the client;
receiving, at the client having the software product that requires debugging, the security token in response to the request from the end user at the client to enable debug logging;
validating, by the software product installed at the client, the security token;
upon a successful validation of the security token, enabling the debug logging of the software product installed at the client;
tracking a duration for which the debug logging has been enabled; and
upon the duration reaching a cutoff duration, disabling the debug logging, wherein the request for the security token comprises an identification of a version of the software product, a hostname of the client at which the software product is installed, and a time of the request,
wherein the security token is generated by applying a symmetric key encryption algorithm to the version identifier of the software product, the hostname, and the time included with the request,
wherein the version identifier is used as a key along with an initialization vector (IV) to encode the hostname, the version identifier, and the time, the IV also being hard-coded with the software product installed at the client, and
wherein the validating comprises:
using the IV hard-coded with the software product and the version identifier to decode, at the client, the security token, thereby obtaining a plain text form of the hostname, the version identifier, and the time;
determining whether each of a plurality of validation checks pass, the plurality of validation checks comprising:
a first validation check passes if the decoded hostname matches the hostname of the client at which the software product is installed;
a second validation check passes if the decoded version identifier matches the version identifier of the software product installed at the client; and
a third validation check passes if the decoded time compared against a current time indicates that a timeout for debug logging has not been reached; and
if each of the plurality of validation checks pass, determining that the validation is successful.

2. The method of claim 1 wherein the enabling the debug logging comprises:
writing, by the software product installed at the client, debug messages to a file at the client; and
encrypting the file storing the debug messages, wherein the file having the debug messages is sent from the client to a support site for review.

3. The method of claim 1 further comprising:
upon a not successful validation of the security token, not enabling the debug logging; and
after the not successful validation, allowing the software product to continue running without the debug logging having been enabled.

4. The method of claim 1 wherein the request to enable debug logging comprises identifying information associated with the software product, and the security token is generated using the identifying information, and
wherein the identifying information comprises the hostname of the client, thereby making a use of the security token restricted to the client at which the software product is installed.

5. The method of claim 1 wherein the validating the security token comprises:
checking an expiration time of the security token against the current time; and
if the current time indicates that the expiration time of the security token has been reached, not enabling the debug logging.

6. The method of claim 1 wherein the enabling the debug logging comprises one or more of logging sensitive information, performing a core dump, or increasing a level of detail for events recorded by the software product.

7. The method of claim 1 further comprising
receiving, at the client, a configuration file comprising the security token and a timeout value, the timeout value indicating the cutoff duration for which debug logging should be enabled; and
reading, by the software product installed at the client, the configuration file to obtain the security token for validation and the timeout value.

8. A system comprising: a processor; and memory configured to store one or more sequences of instructions which, when executed by the processor, cause the processor to carry out the steps of:
issuing, from an end user at a client, a request for a security token to enable debug logging of a software product that requires debugging, the software product being installed at the client, and the request comprising an identification of a version of the software product, a hostname of the client at which the software product is installed, and a time of the request,
wherein the security token is generated by encoding the hostname, the version identifier, and the time that were included with the request;
receiving, at the client having the software product that requires debugging, the security token in response to the request from the end user at the client to enable debug logging;
validating, at the client and by the software product installed at the client, the security token, the validating comprising:
decoding, at the client, the security token to obtain a plain text form of the hostname, the version identifier, and the time;
determining whether each of a plurality of validation checks pass, the plurality of validation checks comprising:
a first validation check passes if the decoded hostname matches the hostname of the client at which the software product is installed;
a second validation check passes if the decoded version identifier matches the version identifier of the software product installed at the client; and
a third validation check passes if the decoded time compared against a current time indicates that a timeout for debug logging has not been reached;
if each of the plurality of validation checks pass, determining that the validation is successful;
upon a successful validation of the security token, enabling the debug logging of the software product installed at the client;
tracking a duration for which the debug logging has been enabled; and
upon the duration reaching a cutoff duration, disabling the debug logging.

9. The system of claim 8 wherein the enabling the debug logging comprises:
writing, by the software product installed at the client, debug messages to a file at the client; and
encrypting the file storing the debug messages, wherein the file having the debug messages is sent from the client to a support site for review.

10. The system of claim 8 wherein the processor further carries out the steps of:

upon a not successful validation of the security token, not enabling the debug logging; and
after the not successful validation, allowing the software product to continue running without the debug logging having been enabled.

11. The system of claim 8 wherein the encoding comprises:
applying a symmetric key encryption algorithm by using the version identifier as a key along with an initialization vector (IV) to encode the hostname and the version identifier.

12. The system of claim 11, wherein the IV is hard-coded with the software product installed at the client.

13. The system of claim 8 wherein the enabling the debug logging comprises one or more of logging sensitive information, performing a core dump, or increasing a level of detail for events recorded by the software product.

14. A computer program product, comprising a non-transitory computer-readable medium having a computer-readable program code embodied therein, the computer-readable program code adapted to be executed by one or more processors to implement a method comprising:
issuing, from an end user at a client, a request for a security token to enable debug logging of a software product that requires debugging, the software product being installed at the client, and the request comprising an identification of a version of the software product, and a hostname of the client at which the software product is installed,
wherein the security token is generated by applying a symmetric key encryption algorithm to the version identifier of the software product and the hostname included with the request,
wherein the version identifier is used as a key along with an initialization vector (IV) to encode the hostname and the version identifier;
receiving, at the client having the software product that requires debugging, the security token in response to the request from the end user at the client to enable debug logging;
validating, at the client and by the software product installed at the client, the security token, the validating comprising:
using the IV and the version identifier to decode, at the client, the security token, thereby obtaining a plain text form of the hostname and the version identifier;
determining whether each of a plurality of validation checks pass, the plurality of validation checks comprising:
a first validation check passes if the decoded hostname matches the hostname of the client at which the software product is installed; and
a second validation check passes if the decoded version identifier matches the version identifier of the software product installed at the client;
if each of the plurality of validation checks pass, determining that the validation is successful;
upon a successful validation of the security token, enabling the debug logging of the software product installed at the client;
tracking a duration for which the debug logging has been enabled; and
upon the duration reaching a cutoff duration, disabling the debug logging.

15. The computer program product of claim 14 wherein the enabling the debug logging comprises:

writing, by the software product at the client, debug messages to a file at the client; and encrypting the file storing the debug messages, wherein the file having the debug messages is sent from the client to a support site for review.

16. The computer program product of claim 14 wherein the method further comprises:

upon a not successful validation of the security token, not enabling the debug logging; and after the not successful validation, allowing the software product to continue running without the debug logging having been enabled.

17. The computer program product of claim 14 wherein the IV is hard-coded with the software product installed at the client.

18. The computer program product of claim 14 wherein the validating the security token comprises:

checking an expiration time of the security token against a current time; and if the current time indicates that the expiration time of the security token has been reached, not enabling the debug logging.

19. The computer program product of claim 14 wherein the enabling the debug logging comprises one or more of logging sensitive information, performing a core dump, or increasing a level of detail for events recorded by the software product.

* * * * *